(12) United States Patent
Alexander et al.

(10) Patent No.: US 11,014,218 B2
(45) Date of Patent: May 25, 2021

(54) FRAME ALIGNMENT JIG (71) Applicant: HED CYCLING PRODUCTS, INC., Roseville, MN (US)

(72) Inventors: Gregory Paul Alexander, Woodbury, MN (US); Michael David Cloutier, Lino Lakes, MN (US); Curt Preston Goodrich, St. Paul, MN (US); Christopher Andrew Edin, Mahtomedi, MN (US)

(73) Assignee: HED CYCLING PRODUCTS, INC., Roseville, MN (US)

( * ) Notice: Subject to any disclaimer, the term of this patent is extended or adjusted under 35 U.S.C. 154(b) by 160 days.

(21) Appl. No.: 16/150,858

(22) Filed: Oct. 3, 2018

(65) Prior Publication Data

US 2019/0099863 A1 Apr. 4, 2019

Related U.S. Application Data

(60) Provisional application No. 62/567,485, filed on Oct. 3, 2017.

(51) Int. Cl.
| | | |
|---|---|---|
| *B25B 11/02* | (2006.01) | |
| *B23K 37/04* | (2006.01) | |
| *B62K 19/30* | (2006.01) | |
| *B62K 19/18* | (2006.01) | |

(52) U.S. Cl.
CPC ......... *B25B 11/02* (2013.01); *B23K 37/0443* (2013.01); *B62K 19/18* (2013.01); *B62K 19/30* (2013.01)

(58) Field of Classification Search
CPC ......... B25B 11/02; B62K 19/18; B62K 19/30; B23K 37/0443; Y10T 29/53683; Y10T 29/53909; Y10T 29/53913; Y10T 29/53961; Y10T 29/53978; Y10T 29/53983; Y10T 29/53991; B23P 19/10; B23P 19/12
USPC .............. 280/281.1, 284, 288.4, 293; 33/533
See application file for complete search history.

(56) References Cited

U.S. PATENT DOCUMENTS

2007/0114752 A1* 5/2007 Ko ......................... B62K 19/16
280/281.1

OTHER PUBLICATIONS

Author: Varco Cycles, Title: Fork Jig, Publication Date: Aug. 19, 2015, URL: https://varcocycles.corn/2015/08/19/fork-jig/ (Year 2015).*
Author: Varco Cycles, Title: Fork Jig, Publication Date: Aug. 19, 2015, URL: https://varcocycles.com/2015/08/19/fork-jig/ (Year: 2015).*

* cited by examiner

*Primary Examiner* — Monica S Carter
*Assistant Examiner* — Alberto Saenz
(74) *Attorney, Agent, or Firm* — Sprinkle IP Law Group (57) ABSTRACT

An alignment jig for holding components relative to a bicycle frame during curing, the alignment jig comprising, a spacing axle adapted to hold respective components a selected distance apart; and an alignment wedge coupled to and spaced from the spacing axle, the alignment wedge adapted to fit between and contact the inner surfaces of a pair of stays of a bicycle frame to align the alignment jig relative to the bicycle frame.

19 Claims, 5 Drawing Sheets

FRAME ALIGNMENT JIG

RELATED APPLICATIONS

This application claims the benefit of priority under 35 U.S.C. § 119(e) to United States Provisional Patent Application No. 62/567,485, filed Oct. 3, 2017, entitled "Frame Alignment Jig," by Alexander et al., which is hereby fully incorporated by reference herein for all purposes.

TECHNICAL FIELD

This disclosure relates generally to assembly jigs. Specifically, embodiments of this disclosure relate to assembly jigs for bicycle frames. More particularly, embodiments of this disclosure relate to alignment jigs for the assembly of bicycle frames.

BACKGROUND

Bicycle frames have long been constructed of multiple pieces. For carbon fiber, composite or mixed material frames, individual components of the frame are often joined to each other, or to other non-carbon or carbon pieces using a bonding agent such as liquid epoxy resin. For example, a dropout or other component may be inserted into a receiving slot or opening in a tube of a carbon fiber frame and bonded to the tube of the frame using a bonding agent. In most cases, this epoxy bonding agent must fully cure before the frame can proceed through the rest of manufacturing. For these bonding agents, in almost all instances the ambient temperature is inversely proportional to the cure time for the resin. In other words, at higher temperature, the epoxy resin cures faster. Accordingly, in order to maximize throughput of a factory, manufacturers desire to cure the bonded assemblies at the highest safe temperature for the materials used. Higher cure temperatures may increase a factory's efficiency while conversely, low cure temperatures reduce a factory's efficiency.

The desired high temperature curing processes may be problematic for a number of reasons. In particular, bicycle frames require a high degree of precision for alignment and assembly (e.g., of their components). Minor misalignment can result in performance or safety issues.

Thus, to obtain the degree of precision desired for alignment and assembly, manufacturers may use an assembly or alignment jig to fix parts in place while they are being assembled (for example, to hold components in alignment during a curing process). Typical alignment jigs are external frameworks (e.g., the jig wraps around the frame). Such jigs may consume two to three times the floor space of the part being assembled. Moreover, traditional alignment jigs require multiple adjustments for each frame, to accommodate variable tube and component dimensions.

Additionally, and importantly, these frameworks are usually made of long tubes of metal, that, when heated, expand greatly and differently than carbon fiber or other materials that may be used for components of a bicycle frame. Unequal coefficients of heat expansion between such alignment jigs and the components being assembled wreaks havoc on frame alignment. Specifically, components that are properly aligned with wet bonding agents (e.g., epoxy) at room temperature will become misaligned if the temperature is elevated before curing of the bonding agent is complete.

Because of these problems, in most cases bicycle frame manufacturers take one of two less than ideal approaches. In the first approach, the bonding of frame components is done completely at room temperature. While desired alignment may be achieved, this approach is slow and results in a less efficient factory and manufacturing process. In the second approach, the bonding of the frame components is accomplished in two steps. The first step is accomplished at room temperature. In this first step, a minimal amount of bonding agent (e.g., epoxy) is applied in order to "tack" or hold the components being bonded in place (which may be accelerated with a handheld heat gun). At this point, bond strength between the two components is less than a desired final bond strength (e.g., is not sufficient for riding); however, the frame can be handled or processed more aggressively. In the second step, the frame then receives the rest of the necessary bonding agent (e.g., epoxy), and can safely go in an oven. Here, because each component (e.g., carbon tube and inserted component), as well as oven temperature, varies slightly, it is more difficult to "offset" the alignment properly (i.e. misalign the frame at room temperature such that it is aligned at cure temperature). While this second approach is faster than the first, it is still slower than a single step curing process at an elevated temperature, and has the additional disadvantages of being more labor intensive and complicating the bonding process (which may make it more prone to error).

Frames with misaligned components resulting from the one-step bond process are typically unfixable. The resulting frame becomes scrap which is expensive to the manufacturer and reduces factory efficiency. While misaligned components on frames resulting from the two-step process can be reworked if they are caught after the first step; this re-work process is both time consuming and expensive.

SUMMARY

What is desired then, are alignment jigs and methods for using such jigs that allow a quick and accurate aligning and assembling (e.g., curing) process for bonded components of a bicycle frame. To that end, among others, embodiments of an alignment jig and methods for their use are disclosed herein.

One embodiment includes an alignment jig for holding components relative to a bicycle frame during curing. The alignment jig comprises a spacing axle adapted to hold respective components a selected distance apart and an alignment wedge coupled to and spaced from the spacing axle, the alignment wedge adapted to fit between and contact the inner surfaces of a pair of stays to align the alignment jig relative to the frame. The alignment jig can be adapted to maintain pressure between the components and the frame based on the force of gravity on the alignment jig. According to one embodiment, the stays are chain stays. Further, according to one embodiment, the components are fork ends, such as dropouts.

The alignment jib may include one or more adjustments. According to one embodiment, the position of a centerline of a spacing axle relative to the alignment wedge or alignment axis is adjustable. Further, according to one embodiment, the distance between the spacing axle and the alignment wedge is adjustable.

According to one embodiment, the spacing axle comprises end faces spaced along a spacing axis, the end faces adapted to abut facing inner surfaces of the respective components. The alignment wedge, according to one embodiment, is spaced from the spacing axle along an alignment axis that is perpendicular to the spacing axis.

The alignment jig, according to one embodiment, includes an alignment clamp adapted to selectively clamp the spacing axle in a selected position. The alignment jig may further include a connecting member extending from the alignment clamp to the alignment wedge. According to one embodiment, the alignment clamp forms a recess in which a first end of the connecting member is received. Further, according to one embodiment, the alignment wedge forms a recess in which a second end of the connecting member is received.

A distance between a first end of the connecting member and the spacing axle may be adjustable to adjust a distance between the alignment wedge and the spacing axle. By way of example, but not limitation, one embodiment may include an adjustment bolt received in the first end of the connecting member, the adjustment bolt adjustable to adjust the distance between the first end of the connecting member and the spacing axle.

According to one embodiment, alignment wedge comprises extensions. The extensions may extend a direction perpendicular to a spacing axis and an alignment axis.

Another embodiment includes a method for bonding components to a bicycle frame. The method may include positioning components on a spacing axle of an alignment jig and positioning an alignment wedge of the alignment jig so that outer surfaces of the alignment jig contact inner surfaces of the stays to align the components with bonding locations on the frame. The method may further include performing a curing operation to cure a bond between the components and the frame at the bonding locations with the alignment jig maintaining vertical pressure between the components and the frame during the curing operation due to the force of gravity.

According to one embodiment, the method includes adjusting a position of the spacing axle relative to the alignment wedge or adjusting a distance of the alignment wedge from the spacing axle.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. A clearer impression of the disclosure will become more readily apparent by referring to the exemplary, and therefore non-limiting, embodiments illustrated in the drawings. Wherever possible, the same reference numbers will be used throughout the drawings to refer to the same or like features (elements). The drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed, there are many problems with current alignment and assembly of components of a bicycle frame. Accordingly, what is desired are alignment jigs (frame alignment tools) and methods for using such jigs that allow a quick and accurate aligning and assembling (e.g., curing) process for bonded components of a bicycle frame.

More specifically, embodiments of an alignment jig as disclosed may include an alignment wedge and an alignment clamp at distal ends of a connecting rod or other connecting member. The alignment clamp is adapted to clamp or otherwise hold a component holding member for holding a component such that when a clamping force of the alignment clamp on the component holding member is released the component holding member may be moved in a direction perpendicular to the connecting member. The alignment clamp and the alignment wedge are adjustably coupled to the connecting member such that they may be moved along the connecting member toward a midpoint of the connecting member or away from the midpoint of the connecting member thereby adjusting the distance between the alignment clamp and the alignment wedge. The alignment wedge is adapted to be braced against or between a second component of a bicycle frame.

In use, then, according to certain embodiments a first component can be coupled to the component holding member of the alignment jig and the component holding member adjusted in in the alignment clamp perpendicular to the connecting member to achieve a first desired distance between the component or the component holding member and the centerline of the alignment jig. The first desired distance may be based on a number of factors, including, for example, the dimensions of the second component to which the first component is to be coupled or a desired position of the first component relative to the second component. Once the desired distance is obtained, the alignment clamp may be tightened to exert a clamping force on the component holding member sufficient to hold the component holding member in place at the desired distance.

A second desired distance between the first component or the component holding member and the alignment wedge can then be set via adjustment of the distance between the alignment wedge and alignment clamp by moving one or both of the alignment wedge or alignment clamp along the connecting member until the second desired distance is achieved. This second desired distance may be determined based on a number of factors, including, for example, the dimensions of the second component to which the first component is to be coupled or a desired contact location on the second component for the alignment wedge.

The surfaces of the first and second component can be prepared for a bonding agent and the bonding agent applied to one or both of the surfaces of the first or second component to be coupled. The first component can then be placed in the desired bonding location on the second component (e.g., inserted into receiving openings on the second component or placed onto the desired mating surface of the second component).

The alignment jig or second component can be oriented such that gravity keeps pressure applied between the first component and the second component with the alignment wedge of the alignment jig placed below the alignment clamp and against or between a contact point of the second component (or another component of the frame). Alternatively, another mechanism may be used to apply a desired pressure in a desired direction between the first component and the second component. The alignment wedge placed between or against the second component may serve to keep the first component from displacing from its initial position relative to the second component during the curing process such that the first and second component will be bonded in the desired orientation regardless of the expansion or contraction of either component (or the alignment jig itself).

In a particular embodiment, an alignment jig may be adapted for use in aligning and assembling dropouts or other fork ends to the chain stays of a bicycle frame. Such an alignment jig may be comprised of any suitable material or mix of materials, including for example, aluminum or other metal or alloy, or a composite material. According to one embodiment of such a jig, embodiments of an alignment jig as disclosed may include an alignment wedge and an alignment clamp at distal ends of a connecting rod or other connecting member. The alignment clamp is adapted to clamp or otherwise hold a spacing axle such that when a clamping force of the alignment clamp on the spacing axle is released the spacing axle may be moved in a direction perpendicular to the connecting rod. For example, the alignment clamp may be a two-piece clamp where the two pieces of the alignment clamp form a receiving area for the spacing axle when coupled. In this manner, an alignment jig may be adapted to work with spacing axles of different sizes (e.g., different length or different diameters).

The spacing axle is adapted to receive two dropouts. In particular, in certain embodiments, the spacing axle is cylindrical and adapted such that each end face of the spacing axle is adapted to receive or abut a dropout. Each end face of the spacing axle may also be adapted to accept a tension element such as a threaded rod or bolt to apply a force on the respective dropout such that a holding force is applied between the end face of the spacing axle and an inside face of the dropout. The spacing axle may have one or more positioning features (e.g., physical features) that can indicate a position or offset of the spacing axle (e.g., with respect to a central axis or place of the alignment jig or connecting rod). These features can include a portion of different (e.g., greater or reduced) diameter or graduated markings or scale.

The alignment clamp and the alignment wedge are adjustably coupled to the connecting rod such that they may be moved along the connecting rod toward a midpoint of the connecting rod or away from the midpoint of the connecting rod, thereby adjusting the distance between the alignment clamp and the alignment wedge. Each of the alignment clamp and alignment wedge may have one or more threaded holes such that set screws may be inserted in these holes and tightened against the connecting rod to apply a holding force to the alignment clamp or alignment wedge. Moreover, the end face of the connecting rod proximate the alignment clamp may be threaded or otherwise adapted to receive an adjustment screw adapted to provide a fine granularity adjustment of the placement of the alignment clamp. The alignment clamp may have a through hole adapted such that the adjustment screw can pass through the hole and be received in the threaded end face of the connecting rod. The head of the adjustment screw may thus contact the outside of the top face of the alignment clamp. The alignment wedge may be a cube or "T" shaped block adapted to be braced against or between a second component of a bicycle frame. The alignment wedge may be symmetrical or asymmetrical, to accommodate almost any shape of chain stays and have a cavity adapted to receive the end of the connecting rod distal from the alignment clamp.

In use, then, according to certain embodiments an alignment jig of a suitable size for a bicycle frame or the chain stays thereof may be selected. For example, there may be alignment jigs adapted for a certain range of frame sizes, length of chain stays or other dimensions of a bicycle frame or components thereof. Similarly, an appropriate size spacing axle can be selected. The selection of an appropriate spacing axle may be based on a desired separation between the dropouts of the bicycle frame being assembled or the separation between the chain stays of the frame. The spacing axle can then be adjusted for a desired offset between the between the center plane of the chain stays of the frame being assembled (e.g., based on the inside faces of the chain stays) and the inside face of each dropout using the positioning feature of the spacing axle. In practice, this offset is often zero (i.e., such that a wheel will be perfectly centered between the dropouts and chain stays when mounted in the dropouts). The alignment clamp can then be tightened to exert a clamping force on the spacing axle.

Next, the distance between the spacing axle (which will be at the center of the dropouts) and the alignment wedge (which may be desired to contact the inside of each chain stays) may be adjusted by moving one or both of the alignment wedge or alignment clamp along the connecting rod until the desired distance is achieved. In particular, the adjustment bolt may be tightened or loosened to decrease or increase a distance between the alignment wedge and alignment clamp. The dropouts can then be placed in position on the end faces of the spacing axle so that the inner faces of the dropouts contact the end faces of the spacing axle, and the dropouts tightened against the spacing axle using a tension element such as a threaded rod or bolt. This fixes the position of the inner faces of the dropouts (where a hub of a wheel will mate) substantially parallel.

The surfaces of the dropouts and the chain stays of the frame can then be prepared for a bonding agent and the bonding agent applied to one or both of the surfaces of the dropouts or chain stays. The dropouts can then be placed in the desired bonding location on the chain stays (e.g., inserted into receiving openings on the chain stays or placed onto the desired mating surface of the second component). The long axis of the chain stays is then oriented vertically (which may also orient the alignment jig vertically such that the alignment clamp is placed above the alignment wedge) so that gravity keeps pressure applied between the dropouts and the chain stays. This continual pressure may serve to counteract thermal expansion of all of the involved components. Additionally, the alignment wedge placed between or against the chain stays may serve to keep the dropouts from displacing from their initial position relative to the chain stays during the curing process. In this manner, the dropouts will sit and remain (and cure) in the proper orientation, relative to the chain stays, substantially regardless of the thermal expansion (e.g., elongation, expansion, contraction or the like) of the components. The curing process can thus be accelerated through use of elevated temperatures without adversely affecting the alignment of the dropouts or chain stays.

Embodiments as disclosed herein may therefore provide a number of advantages, including that embodiments allow frame assemblies or components thereof to be cured in an oven (which reduces processing time) by compensating for the variable rates of thermal expansion between all of the components used in the frame assembly, as well as the alignment jig itself. Specifically, embodiments may utilize gravity or a tension device to accommodate for heat expansion of all components involved, as well as variable oven temperature. Moreover, embodiments do not require any supplemental alignment equipment in order to function properly and may allow a frame assembly, or components thereof, to receive a full dose of bonding agent at once (e.g., there is no need to bond in two steps).

Accordingly, embodiments may compensate for the inevitable variability in molded and machined pieces so that they can be bonded together in a highly accurate and repeatable manner (e.g., as no two tubes or inserted components may ever be the exact same dimension) without significant operator adjustment. Additionally, embodiments may minimize or reduce the space and equipment necessary for the assembly line or factory. As a result of the advantages provided by embodiments as disclosed, bonded frames may almost never need to be scrapped or re-worked, reducing costs and increasing efficiency of a bicycle frame manufacturer.

Figure 1:
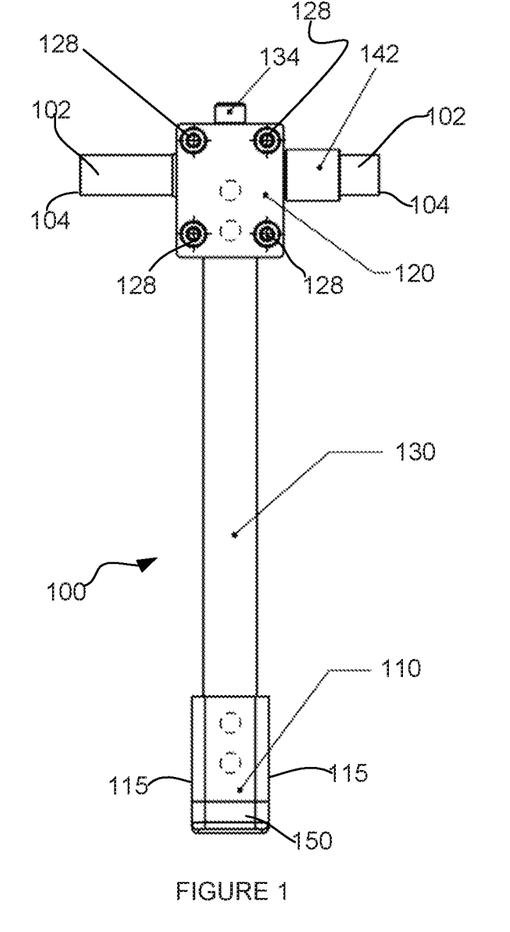
FIG. 1 is a diagrammatic representation of a first view of an embodiment of an alignment jig.
Figure 2:
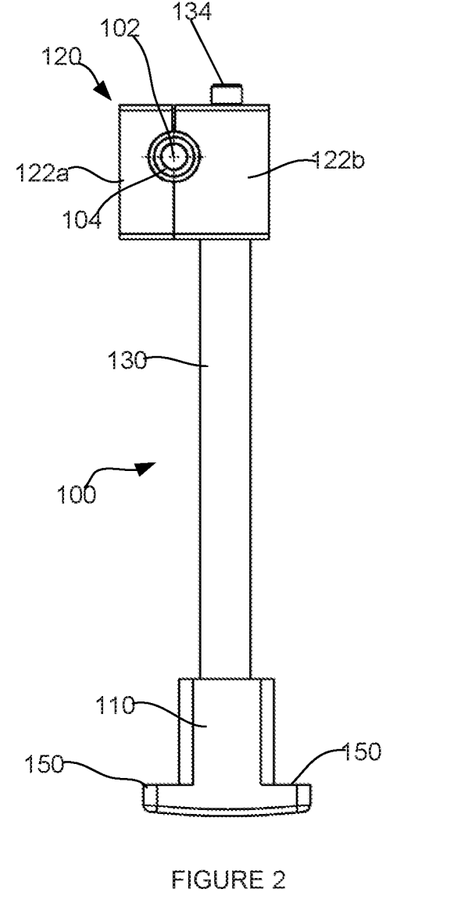
FIG. 2 is a diagrammatic representation of a side view of an embodiment of an alignment jig.
Figure 3:
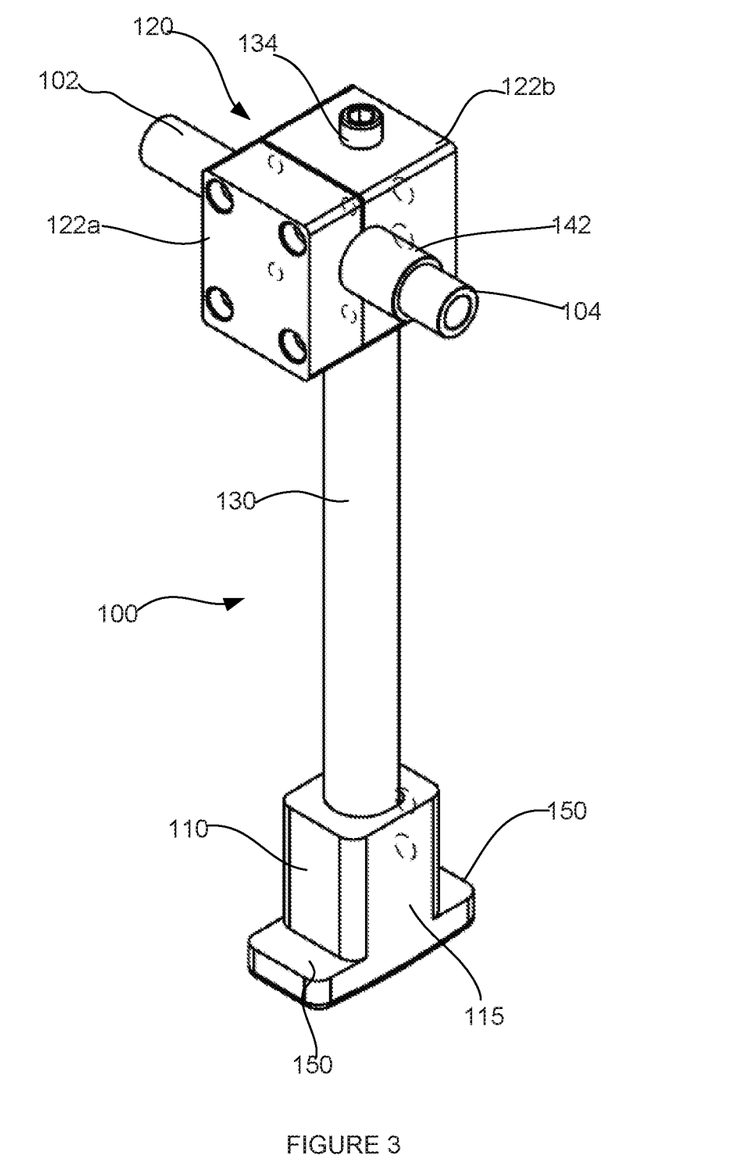
FIG. 3 is a diagrammatic representation of an oblique view of an embodiment of an alignment jig.
Figure 4:
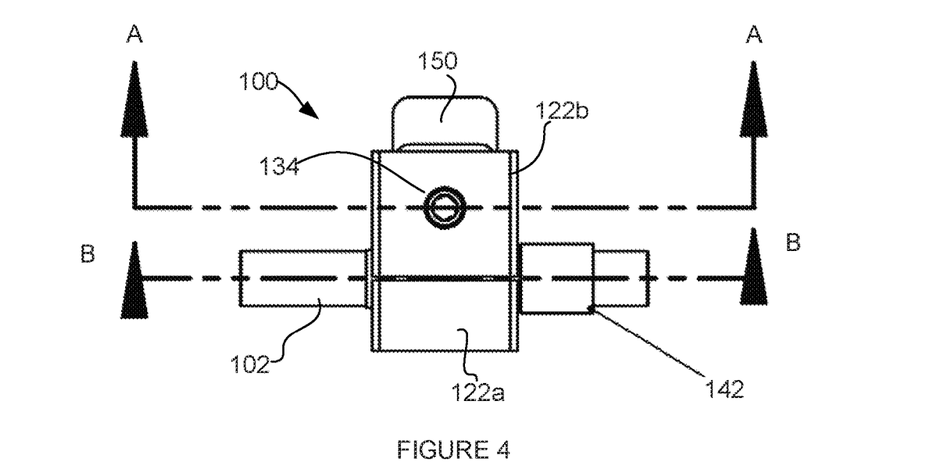
FIG. 4 is a diagrammatic representation of one embodiment of a top view of an embodiment of an alignment jig.
Figure 5:
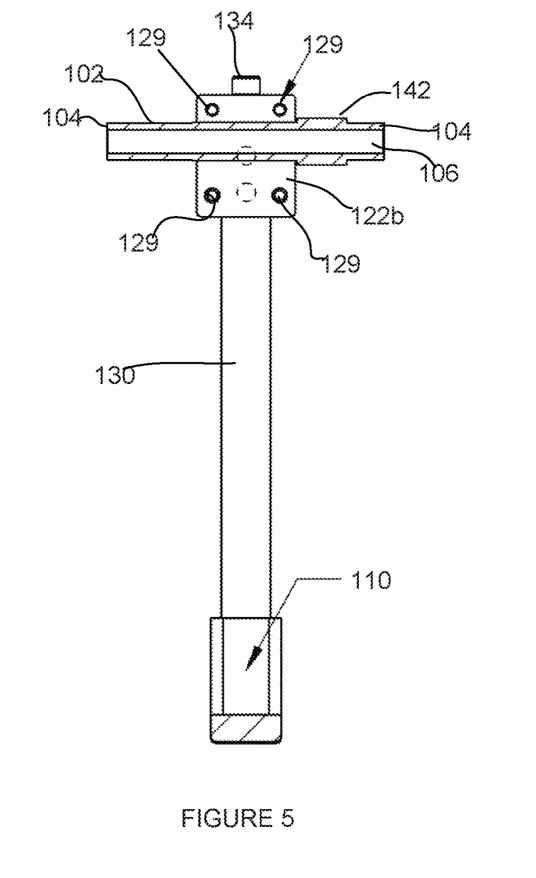
FIG. 5 is a cross-sectional view of one embodiment of an alignment jig taken along plane A of FIG. 4.
Figure 6:
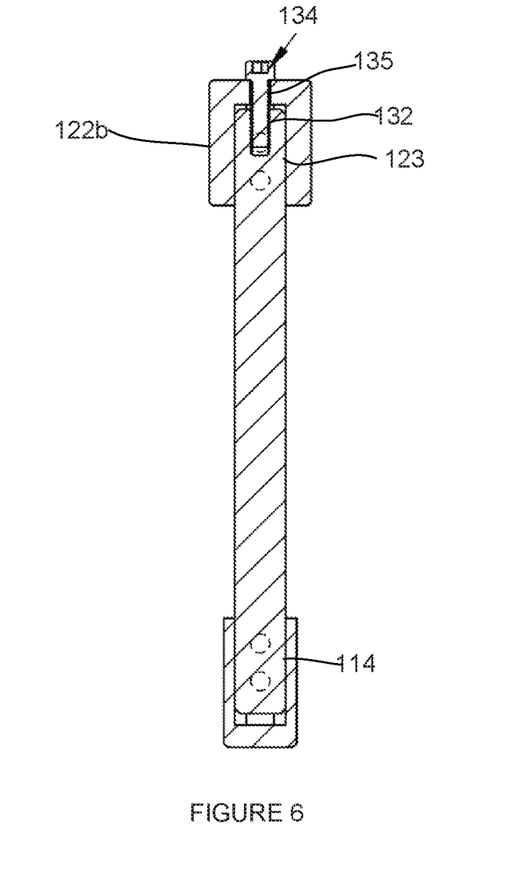
FIG. 6 is a cross-sectional view of one embodiment of an alignment jig taken along plane B of FIG. 4.
Figure 7:
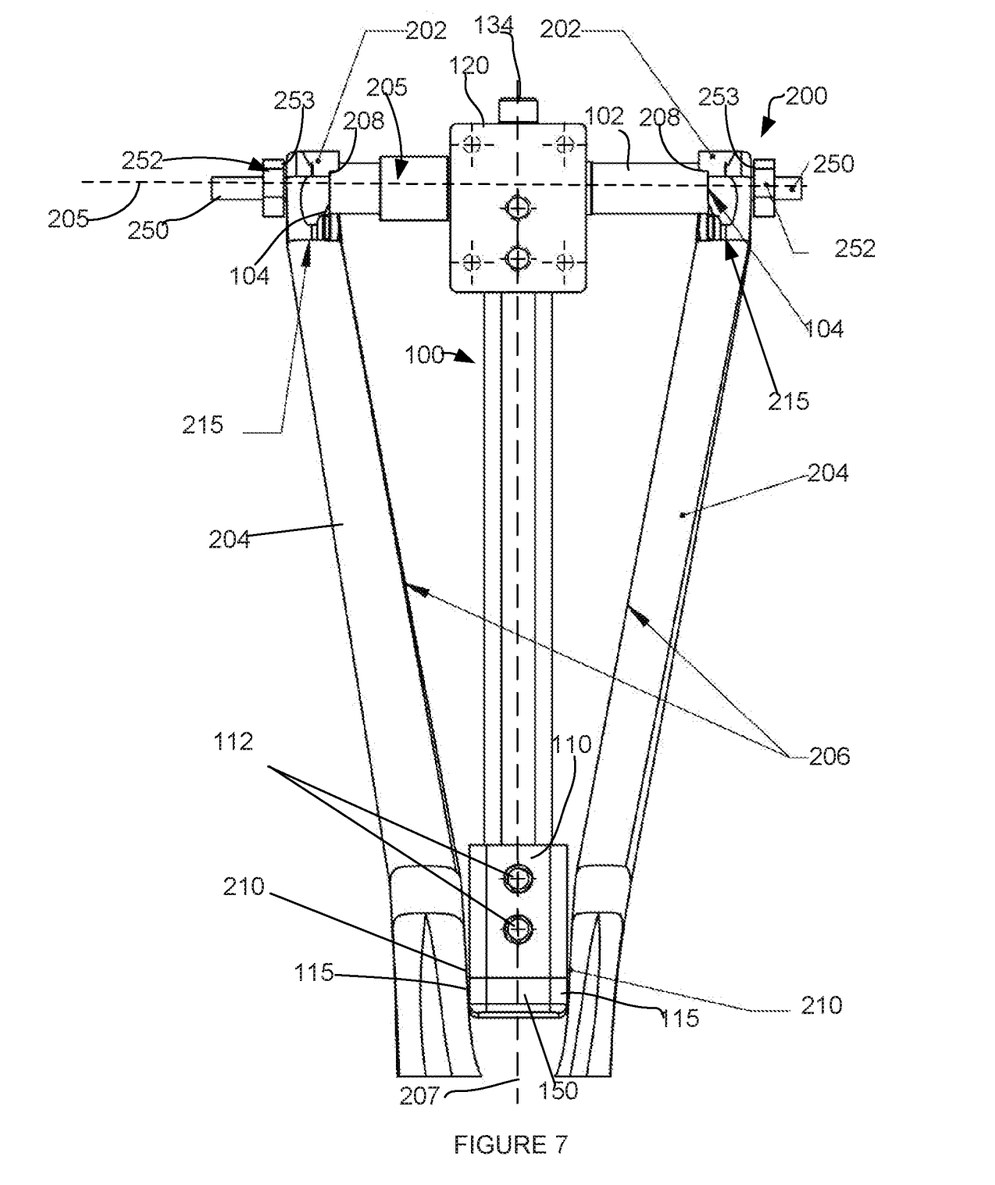
FIG. 7 is a diagrammatic representation of one embodiment of an alignment jig in use.

FIG. 1, FIG. 2, FIG. 3, FIG. 4, FIG. 5, FIG. 6 and FIG. 7 illustrate one embodiment of an alignment jig 100. Alignment jig 100 may be made of any suitable material or mix of materials, including for example, aluminum or other metal or alloy, or a composite material and includes a spacing axle 102, an alignment wedge 110, an adjustment assembly 120 and a connecting member 130, such as a connecting rod or other connecting member. Alignment jig 100 is adapted to maintain alignment of components with a bicycle frame during curing (e.g., in a heating chamber). FIG. 7, for example, illustrates one embodiment of alignment jig 100 in use with a bicycle frame. The frame may include chain stays 204 and other frame portions (not shown), such as, for example, a head tube, top tube, down tube, seat tube, or seat stays.

As illustrated in FIG. 7, alignment jig 100 spacing axle 102, in cooperation with tension element 250 and nuts 252, provides a component holding member adapted to hold fork ends 202 at a distance apart along a spacing axis 205 so that fork ends 202 align with the ends of chain stays 204 or other bonding locations on the frame. Alignment wedge 110 is coupled to spacing axle 102 by adjustment assembly 120 and connecting member 130 and is spaced from the spacing axle 102. Alignment wedge 110 fits between and contacts the inner surfaces 206 of a pair of stays 204 of a bicycle frame to align the alignment jig and hence the fork ends 202 relative to the bicycle frame.

With further reference to FIGS. 1-7, adjustment assembly 120 is adapted to releasably secure spacing axle 102 in a range of positions such that the position of the spacing axle 102 can be adjusted relative to an alignment axis 207 (e.g., an axis from the alignment wedge 110 to spacing axle 102, which may be the center axis of connecting member 130 in some embodiments).

According to one embodiment, adjustment assembly 120 comprises a releasable alignment clamp adapted to assert a clamping force to clamp or otherwise hold spacing axle 102. In the embodiment illustrated, for example, adjustment assembly 120 comprises pieces 122a and 122b that are shaped to form a receiving area for spacing axle 102 when coupled and to act as clamp jaws. The pieces 122a, 122b of the alignment clamp may be coupled using one or more screws or other fasteners that may be adjusted to increase or decrease the clamping force on spacing axle 102. In particular, piece 122a may have through holes 128 and piece 122b may have corresponding receiving holes 129 formed therein, the holes 128, 129 adapted to receive screws or other fasteners and allow the screws or other fasteners to be tightened. When the alignment clamp is released, the spacing axle 102 may be moved perpendicular to connection member 130. Thus, the distance of end faces 104 and, hence of each fork ends 202, from an alignment axis 207 may be adjusted.

Alignment jig 100 may be adapted to work with spacing axles of different sizes (e.g., different length or different diameters). For example, pieces 122a and 122b may be opened, the axle 102 removed and a new axle inserted and clamped. Thus, an operator can select a spacing axle for a particular build.

Spacing axle 102 is adapted to hold fork ends 202. More particularly, in certain embodiments, spacing axle 102, is adapted such that the ends of spacing axle 102 are adapted to receive or abut the fork ends 202. For example, in FIG. 7, end faces 104 of spacing axle 102 are adapted to fit in recesses in and abut inner facing surfaces (that is, the inner faces 208) of the fork ends 202 to hold the fork ends 202 apart along spacing axis 205. While spacing axle 102 is illustrated as a cylindrical spacing axle, spacing axle 102 may have a variety of form factors. Further other types of spacing members or mechanisms may be used to space components.

The end portions of spacing axle 102 are adapted to accept a tension element 250, such as a threaded rod or bolt, that can be used to apply a laterally inward force on the respective fork end 202 such that a holding force is applied between an end face 104 of the spacing member 102 and an inside face of the respective fork end 202. Spacing axle 102, according to one embodiment, defines a central opening 106 running between the end faces 104 such that tension element 250 can pass through spacing member 102. Nuts 252 or other features on the tension element 250 provide inner faces 253 that face respective end faces 104 between which fork ends 202 are held. In another embodiment, spacing member 102 can be threaded at an inside circumference of the end faces 104 so that rods or bolts can be coupled to spacing member 102 to hold fork ends 202 against end faces 104.

Figure 8:
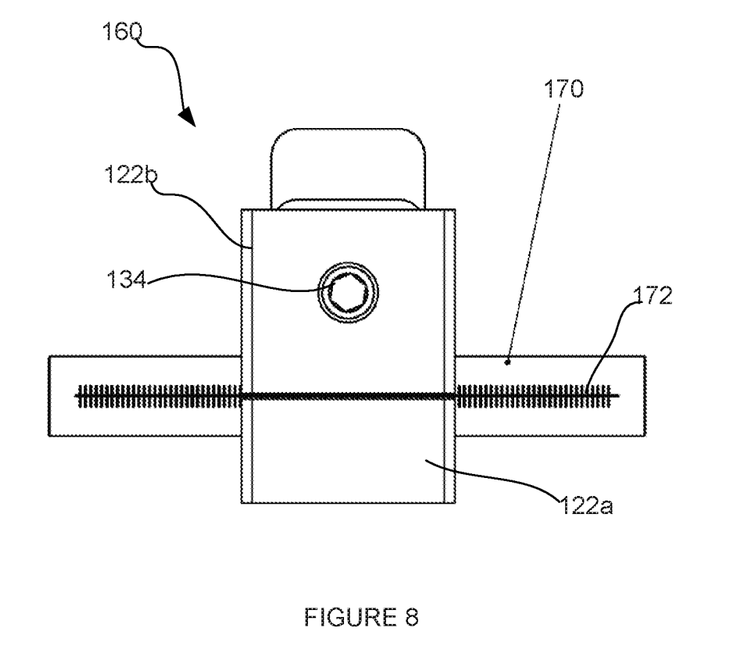
FIG. 8 is a top view of one embodiment of an alignment jig having another embodiment of a spacing axle.

Spacing axle 102 may have one or more positioning features (e.g., physical features) that can indicate a position or offset of the spacing axle 102 (e.g., with respect to a central axis or place of the alignment jig 100 or connecting member 130). These features 142 can include a portion of different (e.g., greater or reduced) diameter or graduated markings or scale. In FIGS. 1-7, for example, spacing axle 102 includes an area of increased diameter that forms a shoulder which abuts against the outer surface or other feature of adjustment assembly 120 to act as a stop when spacing axle 102 is fully inserted into adjustment assembly 120 (e.g., is fully inserted into the adjustment clamp). axles can be provided with the stop in different places so that position of the distance of the fork ends from the alignment axis can be selected. FIG. 8 is a diagrammatic representation of alignment jig 160 in which spacing axle 102 has been replaced with spacing axle 170 having markings 172 etched or otherwise disposed thereon. Markings 172 provide a visual indicator of the position of the spacing axle 170 relative to an alignment axis or other feature.

Returning to FIGS. 1-7, alignment wedge 110 is spaced from spacing member 102 (e.g., along an axis perpendicular to spacing axis 205 in some embodiments) and is adapted to align jig 100 relative to the bicycle frame. Specifically, the alignment wedge 110 may be a symmetrical or asymmetrical shape such as a rectangular prism or "T" shaped block adapted to be braced against, or between, a component of a bicycle frame. For example, alignment wedge 110 can be adapted so that alignment wedge 110 fits between chain stays 204 and the outer surfaces 115 of alignment wedge 110 contact the inner surfaces 206 of chain stays 204 (e.g., at points 210 in FIG. 7). According to one embodiment, surfaces 115 may be parallel to faces 104.

In the "T" shaped embodiment of FIGS. 1-7, extensions 150 help maintain contact with the chain stays 204, seat stays or other portion of the frame during curing.

According to one embodiment, adjustment assembly 120 and alignment wedge 110 are coupled to distal ends of connecting member 130. For example, alignment wedge 110 may have a receiving cavity 114 (e.g., a cylindrically shaped cavity) adapted to receive the end of the connecting member 130 distal from the adjustment assembly 120. Alignment wedge 110 may couple to connecting member 130 with screws or other fasteners. In some embodiments, alignment wedges of different shapes and sizes may be provided so that the operator can select which alignment wedge to use. Similarly, adjustment assembly 120 may include a receiving cavity 123 (e.g., defined by pieces 122a, 122b) to receive connecting member 130.

Adjustment assembly 120 or the alignment wedge 110 may be adjustably coupled to the connecting member 130 such that they may be moved along the connecting member 130 toward a midpoint of the connecting member 130 or away from the midpoint of the connecting member 130, thereby adjusting the distance between the spacing axle 102 and the alignment wedge 110. According to one embodiment, for example, connecting member 130 may be inserted into receiving cavity 114 to a selected depth within a range of depths. Alignment wedge 110 may include threaded openings 112 through which set screws may be tightened to press against the outer surface of connecting member 130 to so secure alignment wedge 100 in place. alignment wedge 110 in position According to one embodiment, the end face 132 of the connecting member 130 proximate the adjustment assembly 120 may be threaded or otherwise adapted to receive an adjustment screw 134 or other adjuster adapted to provide a fine granularity adjustment of the position of connecting member 130 relative to adjustment mechanism 120 and thus provide adjustment of the distance of alignment wedge 110 from spacing axle 102. In the embodiment illustrated, for example, piece 122b has a through hole 135 aligned with a threaded hole 131 in the end of connecting member 130 so that an adjustment screw 134 can pass through the hole and be received in the threaded opening 131 of the connecting member 130. The head of the adjustment screw 134 contacts the outside of the top face of the adjustment assembly 120. Opening 135 may also be threaded to prevent or reduce play between connection member 130 and the adjustment assembly 120.

FIG. 7 depicts one embodiment of an alignment jig 100 in use when bonding fork ends 202 to a bicycle frame having chain stays 204. An alignment jig 100 of a suitable size for a bicycle frame or the chain stays 204 thereof may be selected. For example, there may be alignment jigs adapted for a certain range of frame sizes, length of chain stays or other dimensions of a bicycle frame or components thereof. Similarly, an appropriate size spacing axle 102 can be selected. The selection of an appropriate spacing axle 102 may be based on a desired separation between the fork ends 202 of the bicycle frame being assembled or the separation between the chain stays 204 of the frame. The spacing axle 102 can then be adjusted for a desired offset between the between the center plane of the chain stays 204 of the frame being assembled (e.g., based on the inside faces of the chain stays 204) and the inside face 208 of each fork end 202 using the positioning feature 142 of the spacing axle 102. In practice, this offset is often zero (i.e., such that a wheel will be perfectly centered between the fork ends 202 and chain stays 204 when mounted in the fork ends 202). However, the axle 102 or position of axle 102 relative to alignment axis 207 can be selected to accommodate a variety of configurations. With the position of axle 102 selected, the fasteners of adjustment assembly 120 can then be tightened in the receiving holes to exert a clamping force on the spacing axle 102 to secure spacing axle 102 in place.

The distance between the spacing axle 102 and the alignment wedge 110 may be adjusted by moving one or both of the alignment wedge 110 or adjustment assembly 120 relative to connecting member 130 until the desired distance is achieved (e.g., so that alignment wedge contacts the inner surfaces 206 of both chain stays). In particular, the adjustment bolt 134 may be turned clockwise or counterclockwise to decrease or increase a distance between the alignment wedge 110 and adjustment assembly 120. The fork ends 202 can then be placed in position on the end faces 104 of the spacing axle 102 so the inner faces 208 of the fork ends 202 contact the end faces 104 of the spacing axle 102. The fork ends 202 can be tightened against spacing axle 102 using a tension element 250. This fixes the position of the inner faces 208 of the fork ends 202 substantially parallel (e.g., fixes where the ends of a wheel hub of a wheel will mate the fork ends 202 substantially parallel).

The surfaces of the fork ends 202 and the chain stays 204 of the frame can then be prepared for a bonding agent and the bonding agent applied to one or both of the surfaces of the fork ends 202 or chain stays 204. For example, an epoxy can be placed between the fork ends 202 and chain stays at the desired bonding locations 215. The fork ends 202 can then be placed in the desired bonding location on the chain stays 204 (e.g., inserted into receiving openings on the chain stays or placed onto the desired mating surface of the second component). The long axis of the chain stays 204 can be oriented vertically or the frame otherwise positioned such that the alignment jig 100 is oriented vertically with the adjustment assembly 120 and spacing axle 102 placed above the alignment wedge 110 so that the force of gravity on jig 100 results in alignment jig 100 keeping pressure applied between the fork ends 202 and the chain stays 204. This continual pressure may serve to counteract thermal expansion of all of the involved components. Additionally, the alignment wedge 110 placed between or against the chain stays 204 serves to keep the fork ends 202 from displacing from their initial position relative to the chain stays 204 during the curing process. In this manner, the fork ends 202 will sit (and cure) in the proper orientation, relative to the chain stays 204, substantially regardless of the thermal expansion (e.g., elongation, expansion, contraction or the like) of the components. The curing process can thus be accelerated through use of elevated temperatures without adversely affecting the alignment of the fork ends 202 or chain stays 204.

In some cases, it may not be possible or practical to orient chain stays or other feature of the bicycle frame truly vertically. Thus, in some cases, the connecting member 130 (or alignment axis 207) may not be parallel to the chain stays 204 or other feature being used for alignment. Extensions 150 of alignment wedge 110 can help maintain contact between alignment wedge 110 and chain stays 204 if the stays are not vertical during the curing process.

Figure 9:
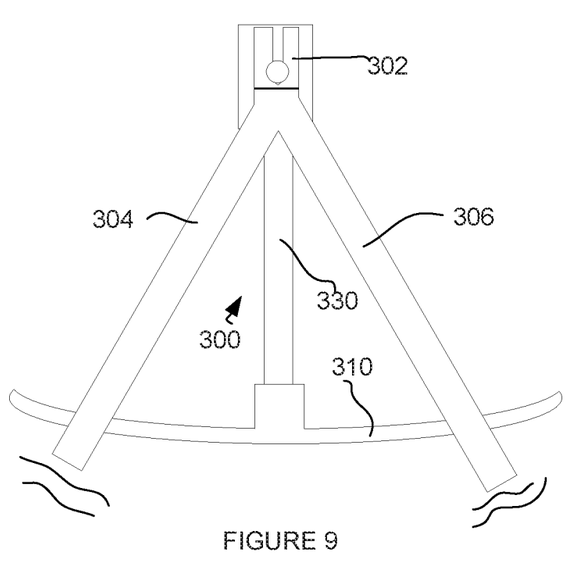
FIG. 9 is a diagrammatic representation of another embodiment of an alignment jig.

Further, in some embodiments, alignment wedge 110 may have other shapes. For example, alignment wedge 110 may have relatively long extensions or bow shaped extensions that are adapted to contact the inside surfaces of the chain stays and the seat stays. Thus, for example, the alignment jig can be used in an operation to bond a fork end proximate to the chain stay/seat stay junction, where the neither the chain stays nor the seat stays are oriented vertically FIG. 9, for example, is a diagrammatic representation of an embodiment of an alignment jig 300 in use when bonding a fork end 302 to a junction of a chain stay 304 and seat stay 306. In this case, the connection member 330 is vertical, but not parallel with the chain stays 304 or seat stays 306. The alignment wedge 310 can be shaped to extend a sufficient distance and have a sufficient width to contact the facing inside surfaces of the chain stays 304 and the facing inside surfaces of the seat stays 306.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the otherwise. Also, as used in the description herein, the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Moreover, those of skill in the art will appreciate that in some instances some features of embodiments of the invention will be employed without a corresponding use of other features without departing from the scope and spirit of the invention as set forth. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Although specific embodiments have been described, these embodiments are merely illustrative, and not restrictive of the invention. The description herein of illustrated embodiments of the invention is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention. Any dimensions provided are provided by way of example and other embodiments may be sized as needed or desired.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An alignment jig for holding components relative to a bicycle frame during curing, the alignment jig comprising: a spacing axle defining a spacing axis, the spacing axle comprising: a first portion adapted to hold a first rear fork end; a second portion adapted to hold a second rear fork end, the first portion and the second portion so spaced to hold the first rear fork end and the second rear fork end a first distance apart to be aligned with bonding locations on the bicycle frame; an alignment clamp adapted to selectively clamp the spacing axle in a selected position, the alignment clamp forming a first receiving cavity; a member coupled to the spacing axle at the alignment clamp, the member extending perpendicular to the spacing axis, the member comprising: a first end disposed in the first receiving cavity of the alignment clamp; and a second end; and an alignment wedge coupled to the member, which extends between the alignment clamp and the alignment wedge, the alignment wedge spaced from the spacing axle and adapted to fit between and contact an inner surface of a first stay of the bicycle frame and an inner surface of a second stay of the bicycle frame to align the alignment jig relative to the bicycle frame based on contact with the inner surface of the first stay and the inner surface of the second stay.

2. The alignment jig of claim 1, wherein a distance between the spacing axle and the alignment wedge is adjustable.

3. The alignment jig of claim 1, wherein the spacing axle comprises a first end face adapted to abut an inner surface of the first rear fork end and a second end face adapted to abut an inner surface of the second rear fork end, the first end face and the second end face so spaced to hold the first rear fork end and the second rear fork end the first distance apart.

4. The alignment jig of claim 3, wherein the alignment wedge is spaced from the spacing axle along an alignment axis that is perpendicular to the spacing axis.

5. The alignment jig of claim 1, wherein the alignment wedge forms a second receiving cavity in which the second end of the member is disposed.

6. The alignment jig of claim 1, wherein a distance between the first end of the member and the spacing axle is adjustable to adjust a distance between the alignment wedge and the spacing axle.

7. The alignment jig of claim 6, further comprising an adjustment bolt received in the first end of the member, the adjustment bolt adjustable to drive the member to adjust the distance between the first end of the member and the spacing axle.

8. The alignment jig of claim 1, wherein the member defines an alignment axis perpendicular to the spacing axis and wherein the alignment wedge comprises:
a first extension extending perpendicular to the spacing axis and the alignment axis to a first side of the alignment wedge and a second extension extending perpendicular to the spacing axis and the alignment axis to a second side of the alignment wedge, the first extension adapted to contact the first stay and the second stay, the second extension adapted to contact a third stay of the bicycle frame and a fourth stay of the bicycle frame.

9. The alignment jig of claim 1, wherein the first stay is a first chain stay and the second stay is a second chain stay.

10. The alignment jig of claim 1, wherein the first rear fork end comprises a first dropout and the second rear fork end comprises a second dropout.

11. The alignment jig of claim 1, wherein the member defines a vertical alignment axis from the first end of the member to the alignment wedge, the vertical alignment axis perpendicular to the spacing axis, and wherein the alignment jig is adapted to downward maintain downward vertical pressure between the first rear fork end and the bicycle frame and the second rear fork end and the bicycle frame.

12. A method for bonding components to a bicycle frame comprising: providing an alignment jig comprising: a spacing axle defining a spacing axis: an alignment clamp adapted to selectively clamp the spacing axle in a selected position, the alignment clamp forming a first receiving cavity; a member coupled to the spacing axle at the alignment clamp and extending perpendicular to the spacing axis, the member comprising a first end and a second end, wherein the first end is disposed in the first receiving cavity of the alignment clamp; an alignment wedge coupled to the member, which extends between the alignment damp and the alignment wedge, the alignment wedge spaced from the spacing axel; positioning a first rear fork end and a second rear fork end at spaced apart positions on the spacing axle of the alignment jig; positioning the alignment wedge below the spacing axle and between and in contact with an inner surface of a first stay of the bicycle frame and an inner surface of a second stay of the bicycle frame to align the first rear fork end with a first bonding location on the bicycle frame and align the second rear fork end with a second bonding location on the bicycle frame; and performing a curing operation to cure a first bond between the first rear fork end and the bicycle frame at the first bonding location and a second bond between the second rear fork end and the bicycle frame at the second bonding location, the alignment jig maintaining downward vertical pressure on the first rear fork end and the second rear fork end during the curing operation due to the force of gravity.

13. The method of claim 12, further comprising adjusting a position of the spacing axle relative to the alignment wedge.

14. The method of claim 12, further comprising adjusting a distance of the alignment wedge from the spacing axle.

15. The method of claim 12, wherein the first rear fork end comprises a first dropout and the second rear fork end comprises a second dropout.

16. The alignment jig of claim 1, wherein the alignment clamp defines a spacing axle receiving area to receive the spacing axle and wherein the alignment clamp comprises a set of releasable clamp jaws that are adjustable to adjust a clamping force on the spacing axle.

17. The alignment jig of claim 16, wherein a distance between the first end of the member and the spacing axle is adjustable to adjust a distance between the alignment wedge and the spacing axle.

18. The alignment jig of claim 16, further comprising an adjustment bolt that passes through a portion of the alignment clamp and is received in the first end of the member, the adjustment bolt adjustable to drive the member to adjust a distance between the first end of the member and the spacing axle.

19. The alignment jig of claim 18, wherein the alignment wedge forms a second receiving cavity in which the second end of the member is disposed.

\* \* \* \* \*

UNITED STATES PATENT AND TRADEMARK OFFICE
CERTIFICATE OF CORRECTION

PATENT NO. : 11,014,218 B2
APPLICATION NO. : 16/150858
DATED : May 25, 2021
INVENTOR(S) : Gregory Paul Alexander et al.

It is certified that error appears in the above-identified patent and that said Letters Patent is hereby corrected as shown below:

In the Claims

Column 14, at Line 16, delete "downward" before the word "maintain".

Column 14, at Line 29, replace "damp" with --clamp--.

Signed and Sealed this
Tenth Day of May, 2022

*Katherine Kelly Vidal*

Katherine Kelly Vidal
*Director of the United States Patent and Trademark Office*